Dec. 1, 1931.  W. E. THAU  1,834,187
CONTROL SYSTEM
Filed June 11, 1927

WITNESSES:
A. J. Schiefelbein
F. E. Hardy

INVENTOR
Walter E. Thau.
BY
Chesley G. Caw
ATTORNEY

Patented Dec. 1, 1931

1,834,187

UNITED STATES PATENT OFFICE

WALTER E. THAU, OF PITTSBURGH, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed June 11, 1927. Serial No. 198,045.

My invention relates to motor-control systems and it is applicable to control the load on a plurality of motors used for the propulsion of paddle-wheel boats.

In paddle-wheel boats of the type in which the paddle wheels are driven by pitman rods connected between the wheels and the motors driving them, it is desirable to drive each pitman rod by a separate motor, in order to limit the power which may be transmitted through the separate connecting or pitman rods to a fraction of the total motor power, and thus prevent undue strain on the pitman rods and on parts connected thereto.

Since a connecting rod or pitman transmits power by a succession of reciprocating motions or thrusts between which are short intervals during which no power is transferred, it becomes necessary to periodically adjust the motor fields to vary the motor output in accordance with the cycle of operation of the pitman. I propose to connect the motor field windings to obtain an automatic field adjustment of the motors. The motor speeds are thus so controlled as to avoid binding of the mechanisms when the pitman rods are near their dead-center positions.

An object of my invention is, therefore, to provide for the periodic adjustment of loads on a plurality of motors connected to drive a common work device in accordance with changes in the cycle of operation of the device.

Figure 1:
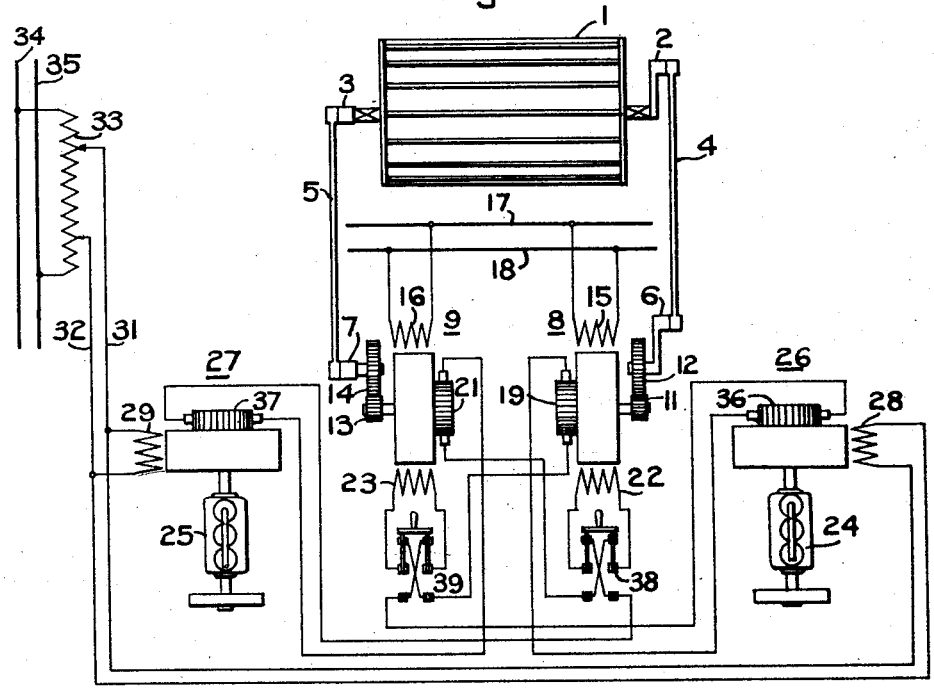

In the accompanying drawings, Figure 1 is a diagrammatic illustration of apparatus and circuits forming an embodiment of my invention.

Figure 2:
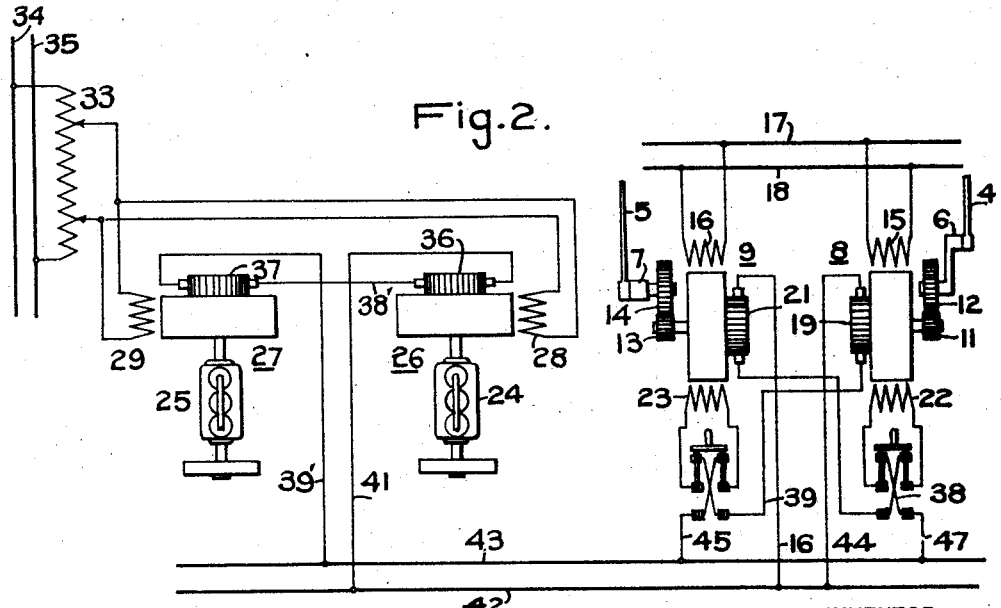

Fig. 2 is a diagrammatic illustration of a modification of the invention illustrated in Fig. 1.

Referring to Fig. 1 of the drawings, a paddle wheel 1 is illustrated as having connected thereto crank arms 2 and 3 for operating the wheel. The crank arms 2 and 3 are preferably spaced at an angle of substantially 90° with respect to each other, and are driven by pitman rods 4 and 5 which are connected to the crank arms 6 and 7, and operated by the driving motors 8 and 9, respectively. The crank arm 6 is illustrated as connected to the shaft of motor 8 through suitable gear wheels 11 and 12, and the crank arm 7 is similarly connected to the shaft of motor 9 through gear wheels 13 and 14.

The motors 8 and 9 are provided, respectively, with field windings 15 and 16 which are energized from a source of electric energy, such as conductors 17 and 18. The motors 8 and 9 are also provided, respectively, with armature windings 19 and 21 and with series field windings 22 and 23 which are connected in a manner to be hereinafter described.

In the form of the invention illustrated in Fig. 1, two prime movers 24 and 25 are provided which respectively drive electric generators 26 and 27. The generators 26 and 27 are provided, respectively, with field windings 28 and 29 which are connected by means of conductors 31 and 32, through a variable resistor 33, to a source of electrical energy, such as the conductors 34 and 35. The generators 26 and 27 are also provided, respectively, with armature windings 36 and 37 which are connected to the armature windings 19 and 21 of the motors 8 and 9. The generator 26 is connected through the armature 19 of the motor 8, reversing switch 39 and the series field winding 23 of the motor 9, while the generator 27 is connected through the armature 21 of the motor 9, reversing switch 38 and the series field winding 22 of the motor 8.

The operation of the system described in Fig. 1 is as follows: The greatest power is transmitted by a connecting rod to the paddle wheel when the connecting rod is in the central portion of its travel, the power communicated decreasing toward the end of each stroke and ceasing entirely as the crank arm passes over the "dead-center" position, increasing again in the opposite direction toward the center of the connecting-rod stroke. Since the crank arms 2 and 3 of the water wheel, and the corresponding crank arms 6 and 7 driven by the motors, have approximately a 90° angular displacement, the dead-center position of one pitman rod and its associated crank arms corresponds to the maximum power-transmitting position of the other pitman rod and its associated crank arms.

In the illustrated position of the connecting rods 4 and 5 in Fig. 1, the motor 9 is delivering its greatest amount of power and, therefore, has its maximum value of armature current. This armature current flows through the series field windings 22 of motor 8, strengthening the motor field and tending to decrease its speed and power output. At the same time, the load on the motor 8 is a minimum since the connecting rod 4 is at one extreme end of its stroke. The armature current of motor 8 is, therefore, at its minimum value, thus weakening the field 23 of the motor 9, causing a maximum output of the motor 9. As the motors 8 and 9 continue to revolve, the outputs of the motors vary periodically between their maximum and minimum values, the maximum value of one motor output corresponding to the minimum value of the other.

Referring to the form of the invention illustrated in Fig. 2 of the drawings, like numerals designate corresponding parts to those shown in Fig. 1. In this modification of my invention, the generators 26 and 27 are connected in series-circuit relation by the conductor 38' and by means of conductors 39' and 41 to bus bars 42 and 43. One side of the motor armature 19 is connected, by means of the conductor 44 to one of the bus bars 42, and the other side is connected, through the reversing switch 39, series field winding 23, and a conductor 45, to the other bus bar 43. The motor armature 21 is connected, by means of conductor 46, to the bus bar 42 and through a reversing switch 38, series field winding 22 and conductor 47 to the bus bar 43.

The operation of the motors 8 and 9, so far as they mutually function to vary the maximum and minimum power outputs of the motors, is the same as in the embodiment of the invention illustrated in Fig. 1. In the second embodiment, however, each of the generators 26 and 27 is available to supply power to each of the motors 8 and 9.

Since modifications may be made in the apparatus and arrangement of parts illustrated and described without departing from the spirit of my invention, I do not wish to be limited otherwise than by the scope of the appended claims.

I claim as my invention:

1. In a motor-control system, a power device, a pair of angularly displaced crank arms on said device, a pair of motors for driving said device, a connecting rod for each motor having a reciprocating motion for transmitting power from said motor through said crank arms to said device, each of said motors comprising an armature winding and a series field winding, the series winding of each motor being connected in series-circuit relation with the armature winding of the other motor.

2. In a control for a ship propulsion system, in combination, a trunnioned stern paddle wheel, a pair of angularly spaced crank-arms fixed to the trunnions, a motor connected to each crank-arm, each motor being provided with a series field winding, the series field windings of the motors being cross-connected, the current flowing through the armature of one motor flowing through the series field winding of the other, whereby when one motor is delivering maximum torque the other is under light load, and the current flowing in the series field winding of the motor delivering maximum torque is small, while the current flowing in the series field of the motor under light load is at a maximum, permitting the one motor to accelerate and the other to decelerate.

3. In a control system for a ship propulsion system, in combination, a trunnioned stern paddle wheel provided with angularly displaced crank-arms, a motor connected to each crank-arm, each motor having a series field winding, a source of power for each motor, the series field winding of one motor being connected in series relation to the armature of the other, to cause a predetermined variation in the field excitations of the motors in accordance with the variations of torque transmitted by the motors to the crank-arms, thereby reducing the operating speed of one motor to a minimum when its crank is in the dead-center position and increasing the speed of the other motor to a maximum at the same time.

4. In a control system for a ship propulsion system, in combination, a trunnioned stern paddle wheel provided with angularly displaced crank-arms, a motor connected to each crank-arm, each motor having a series field winding, a motor-generator set for supplying power to each motor, means for controlling the excitation of the separate motors in response to the variation of torque transmitted to the crank-arms, said means being disposed to effect a variation in speed of the respective motors during each half revolution of the crank-arms, maximum speed occurring when the crank-arms are in their mid-positions and minimum speed when said crank-arms are in the dead-center positions thereby to prevent the lightly loaded motor from over-running when the crank-arms are passing through dead center.

In testimony whereof, I have hereunto subscribed my name this 7th day of June, 1927.

WALTER E. THAU.